United States Patent [19]

Mizutani et al.

[11] Patent Number: 5,126,211
[45] Date of Patent: Jun. 30, 1992

[54] BIAXIALLY ORIENTED POLYAMIDE FILM AND METHOD FOR PRODUCING THE SAME

[75] Inventors: Tomoji Mizutani; Katuyuki Yokota, both of Yatsushiro; Kouichi Misiro, Yatushiro, all of Japan

[73] Assignee: Kohjin Co., Ltd., Tokyo, Japan

[21] Appl. No.: 465,221

[22] PCT Filed: Sep. 14, 1989

[86] PCT No.: PCT/JP89/00941

§ 371 Date: May 17, 1990

§ 102(e) Date: May 17, 1990

[87] PCT Pub. No.: WO90/03882

PCT Pub. Date: Apr. 19, 1990

[30] Foreign Application Priority Data

Oct. 13, 1988 [JP] Japan .................................. 63-255896

[51] Int. Cl.$^5$ ...................... B32B 27/34; B29C 71/02
[52] U.S. Cl. ............................... 428/474.4; 264/235.8; 264/346; 428/475.5; 428/476.1; 428/910
[58] Field of Search .............................. 264/235.8, 346; 428/910, 475.5, 476.1

[56] References Cited

U.S. PATENT DOCUMENTS

| | | | |
|---|---|---|---|
| 3,502,766 | 3/1970 | Tsuruta et al. | 264/289 |
| 4,252,966 | 2/1981 | Matsuoka et al. | 528/335 |
| 4,352,926 | 10/1982 | Matsuoka et al. | 264/290 |

Primary Examiner—Paul J. Thibodeau
Assistant Examiner—D. S. Nakarani
Attorney, Agent, or Firm—Oliff & Berridge

[57] ABSTRACT

Heat setting by the conventional tentering method provides polyamide film which is anisotropic in heat shrinkage. Therefore, only the central part of the film can be used for applications which need a low degree of anisotropy.

The present invention provides an improved method of heat-setting biaxially oriented polyamide film in flat form. Said method is characterized in that biaxially oriented polyamide film, with the edges thereof gripped, is heated to an adequate temperature after preheating the polyamide film when it is desired, which is 10°–40° C. lower than the melting point of the film, by bringing it into close contact with the surface of a heating body, and immediately thereafter the film is cooled to a temperature at which the film does not deform easily.

The present invention also provides biaxially oriented polyamide film which has a uniform heat shrinkage across the entire width of the film. The shrinkage by hot water at 100° C. is smaller than 5.0% in all the directions in the plane, and the anisotropy H (%) in hot water shrinkage which is calculated from the formula below is less than 30%, preferably less than 20%, across the entire width of the film.

4 Claims, No Drawings

BIAXIALLY ORIENTED POLYAMIDE FILM AND METHOD FOR PRODUCING THE SAME

DESCRIPTION

1. Technical field

The present invention relates to biaxially oriented polyamide film, and more particularly, to biaxially oriented polyamide film which has a low degree of anisotropy in heat shrinkage over the entire width of the mill roll. This biaxially oriented polyamide film can be made into bags which are hardly liable to distortion when subjected to heat treatment with hot water or retorting.

2. Background art

Biaxially oriented film of polyamide typified by nylon 6 has outstanding pinhole resistance, heat resistance, low-temperature resistance, and gas barrier property. Owing to these characteristic properties, it is generally used as a packaging material, in the form of composite film with polyethylene sealant, for frozen foods, refrigerated foods, and retort foods.

The production of biaxially oriented polyamide film involves the steps of subjecting a polyamide resin to melt extrusion, cooling and solidifying the extruded film, reheating the unoriented film and subjecting it to drawing in the machine direction (MD) and transverse direction (TD), and heat-setting the drawn film. Drawing is usually accomplished by sequential biaxial drawing in flat form, simultaneous biaxial drawing in flat form, or simultaneous biaxial drawing in tubular form.

After biaxial drawing, biaxially oriented polyamide film undergoes heat setting under tension at a temperature close to the melting point of the film. Heat setting makes the film resistant to shrinkage that takes place during storage or in the subsequent steps such as printing and lamination.

After heat setting, biaxially oriented polyamide film is combined with a sealant such as polyethylene and polypropylene by the aid of an adhesive and fabricated into composite bags, which are used for food packaging. Food packages usually undergo heat treatment at 70°-80° C. or above in hot water, boiling water, or pressurized hot water for the purpose of sterilization of foods.

Unfortunately, biaxially oriented polyamide film has a disadvantage that it greatly shrinks during hot water treatment even after heat setting. This is true particularly of the case in which packaging bags are made from the marginal part of the heat-set film. Such packaging bags are subject to distortion during hot water treatment for sterilization. This distortion deteriorates the appearance of the package and hence lowers the commercial value of the package. In addition, such packaging bags are liable to S-curling (bag distortion) that takes place before hot water treatment, and this often hinders the automatic filling operations.

The distortion of packaging bags occurs because the film as the raw material is anisotropic in heat shrinkage. In other words, the film shrinks in hot water in the machine direction (MD) differently than in the transverse direction (TD). (The maximum shrinkage takes place in the direction of film advance.) When a film with a high degree of anisotropy is made into bags by folding, the resulting bags are subject to distortion because the front side and back side shrink in different directions.

In the present invention, the anisotropy is expressed in terms of the difference between the degrees of shrinkage (caused by hot water) in the directions 45° and 135° deviated to the left from the machine direction (MD).

The above-mentioned distortion is liable to occur in the case where packaging bags are made from marginal parts of film drawn in the flat form by the tenter method. By contrast, such anisotropy does not exist in film drawn in the tubular form. However, this film becomes anisotropic when it undergoes heat setting by the tenter method for the reduction of shrinkage in hot water. This tendency becomes significant in the case of heat setting which is carried out at a temperature close to the melting point of the resin from which the film is made. It is known well that this phenomenon is attributable to bowing. Bowing occurs when film undergoes uneven drawing in the tentering process. Bowing can be visualized when film is tentered, with a straight line drawn across the film width. As the film undergoes orientation by tentering, the straight line bends, with the center concaved backward (with respect to the direction of film advance). Bowing occurs because the edges of the film are moved forward compulsorily by the grips, whereas the central part of the film is pulled backward by the tension in the film surface. A film specimen taken from the film which has experienced bowing will not shrink evenly in all directions when heated, for example, in hot water at 100° C. In other words, the direction of the maximum shrinkage does not coincide with MD or TD. If the magnitudes of shrinkage in all the directions are represented by vectors diverging from a center, the ends of the vectors will form an ellipse, with its major axis inclined with respect to the machine direction.

If a wide film undergoes heat setting on a tentering machine, severe bowing occurs, with the result that the central part of the film has a comparatively low degree of anisotropy and the marginal parts of the film have a remarkably high degree of anisotropy. Therefore, only the central part of the film can be used for making distortion-free bags, and the marginal parts of the film have to be discarded. This leads to unpracticably poor yields.

It was found that there are many commercial grades of heat-set polyamide film which have a high degree of anisotropy.

On the other hand, it was also found that oriented film heat-set by the tubular process (which blows up a tubular film with air) has a much lower degree of anisotropy in heat shrinkage than oriented film made by the tentering method. Heat setting by the tubular process, however, is not practicable for oriented film in the form of a large tube. Usually, tubular film undergoes heat setting in the folded form or the cut-open flat form, and heat setting in this manner poses a problem associated with anisotropy as mentioned above. Many attempts have been made to solve these problems; but they are not successful so far.

Disclosure of the invention:

Heat setting by the conventional tentering method provides polyamide film which is anisotropic in heat shrinkage. In other words, the marginal parts of the film have a high degree of anisotropy in heat shrinkage, and only the central part of the film can be used for applications which need a low degree of anisotropy.

It is an object of the present invention to provide an improved method of heat-setting biaxially oriented polyamide film in flat form. According to the method of the present invention, biaxially oriented polyamide film, with the edges thereof gripped, is heated to an adequate temperature, which is 10°-40° C. lower than the melting point of the film, by bringing it into close contact with the surface of a heating body such as heat roll and heat belt, and immediately thereafter the film is cooled to a temperature at which the film does not deform easily.

It is another object of the present invention to provide biaxially oriented polyamide film which has a uniform heat shrinkage across the entire width of the film. The shrinkage by hot water at 100° C. is smaller than 5.0% in all the directions in the plane, and the anisotropy H (%) in hot water shrinkage which is calculated from the formula below is less than 30%, preferably less than 20%, across the entire width of the film.

$$H (\%) = \frac{|S_{45} - S_{135}|}{\frac{S_{45} + S_{135}}{2}} \times 100$$

(where $S_{45}$ and $S_{135}$ respectively denote the shrinkage (by hot water at 100° C.) in the directions deviated leftward 45° and 135° from the machine direction.)

With a degree of anisotropy H (%) higher than 30%, the film will provide packaging bags which are of no practical use on account of extreme distortion. A preferred degree of anisotropy H (%) should be smaller than 20%.

The method of the present invention performs heat setting on biaxially oriented polyamide film to give uniformly thick heat-set film which, when exposed to hot water at 100° C., exhibits a degree of anisotropy H (%) smaller than 30% at any position across the entire width of the film and undergoes shrinkage smaller than 5.0% in all the directions. The heat-set film can be made into bags after lamination with a sealant material, and the resulting bags are substantially free from distortion even after sterilization by boiling or retorting, no matter what part of the film is used for the bags.

BEST MODE FOR CARRYING OUT THE INVENTION

The heat-setting method of the present invention is not effective for the biaxially oriented film of thermoplastic plastic resin other than polyamide which has originally a low hot water shrinkage; however, it produces a pronounced effect on polyamide film which has a large hot water shrinkage and undergoes heat treatment with hot water or retorting in its most applications.

The polyamide film in the present invention is produced from aliphatic polyamide resins (such as nylon 6, nylon 66, nylon 12, and nylon 11), polyamide copolymer resins composed mainly of the monomer constituting said aliphatic polyamide resins, aromatic polyamide resins, and blends of these polyamide resins.

The melting point of the resin is measured by the DSC method provided in JIS K-7121 (Method for measuring the transition point of plastics), Section 3(2).

The melting point of a blend resin is a weighted mean (proportional to the blending ratio) of the melting points of the individual resins comprising the blend. In the case where a copolymer resin has two or more melting points, the melting point of such a copolymer resin is a weighted mean proportional to the peak areas of the individual melting points.

The heat-setting method of the present invention can be advantageously applied to biaxially oriented polyamide film formed by the tubular stretching method, which has a low degree of anisotropy. This is because heat setting does not reduce anisotropy in heat shrinkage and the film for heat setting should originally have a low degree of anisotropy in heat shrinkage.

The heat setting in the present invention may be carried out using any heating body which has a smooth surface. The heating body is not necessarily made of a metal. A preferred heating body is a heat roll or heat belt which provides an endless surface suitable for industrial continuous production. In addition, the surface of a heating body should preferably be smooth for close contact with the film; but it may have small irregularities which do not prevent close contacting.

The heating body is heated to a temperature close to the ordinary heat setting temperature. According to the heat setting method of the present invention, the heat setting temperature should be in the range of the melting point minus 10° C. to the melting point minus 40° C. With a heat setting temperature higher than the upper limit, the film undergoing heat setting softens and sticks to the surface of the heating body (such as a heat roll and heat belt). This blocking deteriorates the smoothness and clarity of the film, making the film of no practical use. Conversely, with a heat setting temperature lower than the lower limit, the film does not undergo sufficient heat setting.

To effect heat setting, the film is kept in close contact with the surface of the heating body for a certain length of time, which is properly selected according to the kind of polyamide resin and thickness and heat-setting temperature of the film. The thinner the film or the higher the heat-setting temperature, the shorter the contact time. Contact for about 0.5 second is usually sufficient. When the film is brought into close contact with the surface of the heating body, the edges of the film are gripped to ensure the close contact by preventing shrinkage in the widthwise direction. If the oriented film is simply brought into contact with the heating body (such as heat roll and heat belt), close contact is not obtained because the film undergoes heat shrinkage. Any oriented film which is liable to shrinkage in the widthwise direction is of no practical use because shrinkage gives rise to the thickening of edges. The above-mentioned heat setting may be carried out in multiple stage. In this case, the temperature in the later stage should be higher than that in the previous stage.

In the last stage of heat setting, the film should preferably be cooled to a temperature at which the film does not deform easily. Such a temperature is, for example, the melting point minus 135° C. For the minimum film deformation, the film should be cooled below the glass transition point (Tg) of the film. Such cooling is practically effected by bringing the film into contact with the surface of a cooling body such as a water-cooled roll. Without sufficient cooling, the film is deformed by tension and the process cannot be controlled smoothly. Transfer of the film from the heating unit to the cooling unit should be carried out in such a way as to prevent shrinkage in the widthwise direction, because the heat-set film leaving the heating unit is still very hot. This object is achieved if a rubber roll (or the like) of comparatively low temperature is placed between the heating unit and the cooling unit, so that the heat-set film moves, keeping itself in close contact with the surface of the rubber roll. The rubber roll should preferably be close to the heat roll (or heat belt) and the cooling roll, so that the heat-set film does not become completely or nearly free during its transfer.

The above-mentioned heat setting should preferably be preceded by a preheating stage. Preheating protects the film from blocking and whitening when the film comes into contact with a heating body at a high temperature. Thus, preheating permits efficient heat setting at a high temperature. Preheating should be carried out at temperatures ranging from the melting point minus 40° C. to the melting point minus 135° C. (preferably 105° C.). With a temperature lower than the lower limit, preheating produces almost no effect. Preheating may be carried out in multiple stages by means of a heat roll or heat belt at a temperature lower than the heat-setting temperature. In the case where preheating is carried out in two or more stages, the preheating temperature should be increased sequentially from one stage to another. Preheating in the stage at a comparatively low temperature may be carried out by the tentering method. The preheating steps should preferably be followed immediately by quenching.

EXAMPLES

The invention will be described in more detail with reference to the following examples, which are not intended to restrict the scope of the invention.

In the examples, the characteristic properties of film were measured according to the following methods.

(1) Shrinkage by hot water at 100° C. and anisotropy

Shrinkage in all the directions is represented by shrinkage in the machine direction (MD), transverse direction (TD), and directions deviated 45° and 135° leftwards from the machine direction (MD).

A square film specimen, measuring 120 mm by 120 mm, is cut from the film which has undergone heat setting. (The center of the square film specimen coincides with a prescribed position measured in the widthwise direction of the film.) At the square film specimen is drawn a circle, 100 mm in diameter. Marking lines, 100 mm long, passing through the center of the circle are drawn in the MD direction, the TD direction, and the directions deviated 45° and 135° leftward from the MD direction (referred to as MD-45° direction and MD-135° direction, respectively, hereinafter). After conditioning at 20° C. and 65% RH for 1 day, the length of the marking lines on the film specimen are accurately measured.

The film specimen is dipped in hot water (at 100° C.) for 30 minutes. After wiping and conditioning at 20° C. and 65% RH for 1 day, the length of the marking lines on the film specimen are accurately measured again. Hot water shrinkage S (%) in each direction is calculated from the following formula.

$$S (\%) = \frac{M_0 - M}{M_0} \times 100$$

(where M denotes the length of the marking line measured after dipping, and $M_0$ denotes the length of the marking line measured before dipping.)

Then, a degree of anisotropy H (%) in hot water shrinkage is calculated from the following formula.

$$H (\%) = \frac{|S_{45} - S_{135}|}{\frac{S_{45} + S_{135}}{2}} \times 100$$

$S_{md}$, $S_{td}$, $S_{45}$, and $S_{135}$ denote the hot water shrinkage S (%) in the MD direction, TD direction, MD-45° direction, and MD-135° direction, respectively.

(2) Distortion of filled bag caused by hot water treatment

A composite film is formed by dry lamination from sample film and 40-μm thick LLDPE film (having a melting point of 126° C. and a density of 0.935), with one side corona-treated, using a urethane resin adhesive ("AD-305/AD-355", 1:1 wet ratio, made by Toyo Morton Co., Ltd.), with the corona-treated side facing inward.

The composite film is folded in two and cut at the fold. Two pieces of the composite film placed one over the other undergo bag making in such a manner that two bags of three-sided seal type are formed side by side at one time. (One bag is formed from the marginal part of the film, and the other bag is formed from the central part of the film.) Thus there are obtained three-sided seal bags each measuring 250 mm (in the MD direction) and 200 mm (in the TD direction). The bag made from the marginal part of the film is filled with 150 cc of water and heat-sealed. The filled bag is dipped in hot water (at 100° C.) for 30 minutes. After heat treatment, the filled bag is visually examined for distortion according to the following criteria.

A: no distortion
B: almost no distortion
C: slight distortion
D: severe distortion (3) Edge thickness The edge thickness of the heat-set film is expressed by an average value of measurements made at five points at intervals of 60 mm in the MD direction, 120 mm inward from the edge.

EXAMPLE 1

Nylon 6 (having a melting point of 215° C.) was made into a lay-flat tube (having a film thickness of 150 μm and a lay-flat width of 600 mm) by melt extrusion from a tubular die, followed by quenching and solidification.

The lay-flat tube was passed through two sets of nip rolls running at different circumferential speeds to effect simultaneous biaxial orientation (3×3 times) at 80°–100° C. by utilizing the pressure generated in the tube. Thus there was obtained biaxially oriented film having a lay-flat width of 1800 mm and a film thickness of 17 μm. This film wa separated into two webs by cutting the edges, and the webs were wound onto two separate cores.

The film was unwound and passed at a rate of 80 m/min through a 1-m long tenter oven at 120° C. for preheat treatment, with the edges of the film gripped by tenter chucks to keep the film width constant. Immediately after the passage through the tenter oven, the film was cooled by a water-cooled roll. The film was introduced to a 1-m long endless heat belt at 180° C. The film was brought into close contact with the surface of the heat belt for heat treatment. During this heat treatment, the edges of the film were fixed by heat resistant endless pressing belts so as to protect the film from heat shrinkage in the widthwise direction. The film was transferred to a rubber roll running in contact with the surface of the heat belt and the surface of the cooling roll (mentioned later). The film was further transferred to a cooling roll (300 mm in diameter) whose surface is kept at 40° C. by cooling water circulating therein. The film was kept in contact with the cooling roll for 0.5 second so that the film was quenched below 80° C. Thus the heat setting was completed. The heat-set film was wound up.

From the heat-set film was taken a square film specimen (120 mm by 120 mm). The center of the square film specimen is at the position 120 mm inward from the edge of the film web. The square film specimen was tested for $S_{Md}$, $S_{TD}$, $S_{45}$, and $S_{135}$ according to the above-mentioned method.

The heat-set film was subsequently cut into two parts, each 840 mm in width, and the edges, 60 mm each, damaged by grips were cut off using a slitter. The two webs of the film were wound onto separate cores. The film of the right web as viewed in the MD direction was made into a composite film as mentioned above. The resulting composite film was made into bags and the bags were filled with water as mentioned above. The filled bags were tested for distortion by hot water as mentioned above. The results are shown in Table 1.

EXAMPLES 2 AND 3 AND COMPARATIVE EXAMPLES 1 AND 2

Various kinds of nylon 6 film were prepared in the same manner as in Example 1, except that the temperature of the heat belt was changed to 190° C., 200° C., 170° C., and 210° C., respectively. They were evaluated in the same manner as in Example 1. The results are shown in Table 1.

EXAMPLE 4

The same procedure as in Example 2 was repeated to give heat-set film, except that the preheating temperature was changed to 160° C. The film was evaluated in the same manner as in Example 1. The results are shown in Table 1.

EXAMPLE 5

The same procedure as in Example 2 was repeated to give heat-set film, except that the rubber roll between the heat-set roll and the cooling roll was removed and a 120-mm long unsupported zone was formed. The film was evaluated in the same manner as in Example 1. The results are shown in Table 1.

EXAMPLE 6

Nylon 6 film was prepared in the same manner as in Example 1, except that the preheating tenter oven was not heated and the temperature of the heat belt was changed to 200° C. The film was evaluated in the same manner as in Example 1. The results are shown in Table 1.

EXAMPLES 7 AND 8 COMPARATIVE EXAMPLES 3 AND 4

In Example 7, there was obtained biaxially oriented lay-flat nylon 6 film, 1800 mm wide, in the same manner as in Example 1. The nylon film was cut into two parts. For preheating, the film was passed on an endless belt, heated at 150° C., in contact with the film over a length of 1 meter. During this heat treatment, the edges of the film were fixed by endless pressing belts so as to protect the film from heat shrinkage in the widthwise direction. The film was transferred to a water-cooled roll whose surface was kept at 40° C. Subsequently, the film was passed over a heat roll (400 mm in diameter) heated at 190° C. for heat treatment. During this heat treatment, the film was brought into contact with the heat roll by means of heat resistant belts which press edges of the film against the heat roll over two-thirds of the circumference of the heat roll. The film was passed through the rubber roll and then cooling roll in the same manner as in Example 1. The heat-set film was wound up.

The same procedure as in Example 7 was repeated in Example 8 and Comparative Examples 3 and 4, except that the temperature of the heat belt for preheating was changed to 180° C., 170° C., and 180° C., respectively, and the temperature of the heat roll for heat setting was changed to 200° C., 170° C., and 210° C., respectively. The thus obtained heat set film was evaluated in the same manner as in Example 1. The results are shown in Table 1.

COMPARATIVE EXAMPLES 5 TO 7

The same procedure as in Example 7 was repeated to give various kinds of heat-set film, except that the film underwent heat setting by passing through a hot air tenter at 200° C., 210° C., and 220° C., respectively, for 6 seconds, with the edges of the film gripped by tenter chucks. The thus obtained heat set film was evaluated in the same manner as in Example 1. The results are shown in Table 1.

EXAMPLE 9 AND COMPARATIVE EXAMPLES 8 AND 9

Biaxially oriented film was prepared in the same manner as in Example 1 from a 30/70 blend of nylon 6 (having a melting point of 215° C.) and nylon 66 (having a melting point of 260° C.), with the weighted average melting point being 247° C.

This film underwent preheat treatment in a tenter oven at 130° C. and then heat-set by means of a heat belt in the same manner as in Example 1, except that the temperature of the heat belt was changed to 230° C., 200° C., and 240° C., respectively. The thus obtained heat set film was evaluated in the same manner as in Example 1. The results are shown in Table 1.

Table 1 shows the following. The method of the present invention provides film which has a low hot-water shrinkage and a low degree of anisotropy in hot-water shrinkage, even in the marginal parts. This film is obtained by heating biaxially oriented film in close contact with a heat roll at a temperature which is 10°–40° C. lower than the melting point of the film, with the edges of the film gripped, and then quenching the film at a temperature which is 135° C. lower than the melting point, thereby heat-setting the film. The thus obtained heat-set film can be made into bags which are hardly subject to distortion by hot water treatment. This is true even in the case where the marginal parts of the film are used. By contrast, the film which was heat-set by means of the conventional hot air tenter has a high degree of anisotropy in hot water shrinkage and provides bags which are subject to distortion (as in Comparative Examples 5 and 6).

In the case where the heat-set temperature is lower than the melting point minus 40° C., the resulting film has a hot-water shrinkage greater than 5.0% on account of insufficient heat setting. Such film gave rise to great overall shrinkage in the distortion test (as in Comparative Examples 1, 3, and 8). On the other hand, in the case where the heat-set temperature is higher than the melting point minus 10° C., blocking to the heat roll occurred (as in Comparative Examples 2, 4, and 9). In the case where a tenter was used, whitening occurred (as in Comparative Example 7).

In the case where heat setting is carried out at a higher temperature side in the range from the melting point minus 10 to the melting point minus 40° C., it is desirable to subject the film to pretreatment at a temperature lower than the above-mentioned range. This pretreatment treatment prevents the blocking tendency of the film. (Example 4).

In the case where preheating is carried out at a high temperature by the tenter method, the film becomes to have a high degree of anisotropy in heat shrinkage (as in Example 4). Therefore, preheating by a tenter should not be carried out at an excessively high temperature.

$$H'(\%) = \frac{|S_{45} - S_{135}|}{\frac{S_{45} + S_{135}}{2}} \times 100$$

(where $S_{45}$ and $S_{135}$ respectively denote the shrinkage (by hot water at 100° C.) in the directions deviated leftward 45° and 135° from the machine direction.)

It is noted that the two kinds of the film tested have a high degree of anisotropy. It is presumed that the film of roll 1 coincides with the center of the mill roll at the intermediate between the left edge and the center. It is also presumed that the film of roll 2 coincides with the center of the mill roll at an imaginary point beyond the right edge. In other words, it is presumed that the film of roll 1 was obtained from that part of the web that coincides with the center of the mill roll, and the film of roll 2 was obtained from that part of the web which is very close to the edge of the mill roll.

TABLE 1

| Example | m.p. (°C.) | Preheating stage Device | Preheating stage Temp. (°C.) | Heat-setting stage Device | Heat-setting stage Temp. (°C.) | Hot water shrinkage (%) $S_{MD}$ | $S_{TD}$ | $S_{45}$ | $S_{135}$ | H (%) | Distortion | Film thickness Center (μm) | Film thickness Edge (μm) |
|---|---|---|---|---|---|---|---|---|---|---|---|---|---|
| 1 | 215 | TO | 120 | HB | 180 | 4.2 | 3.8 | 4.1 | 3.6 | 15 | A | 17.0 | 17.1 |
| 2 | 215 | TO | 120 | HB | 190 | 3.2 | 2.9 | 3.0 | 2.7 | 11 | A | 17.0 | 17.2 |
| 3 | 215 | TO | 120 | HB | 200 | 2.5 | 2.4 | 2.4 | 2.2 | 9 | B | 17.0 | 17.1 |
| 4 | 215 | TO | 160 | HB | 190 | 2.8 | 2.6 | 3.1 | 2.4 | 25 | C | 17.0 | 17.1 |
| 5 | 215 | TO | 120 | HB | 190 | 3.2 | 2.7 | 2.9 | 2.6 | 11 | B | 17.0 | 22.1 |
| (1) | 215 | TO | 120 | HB | 170 | 5.4 | 4.9 | 5.2 | 4.6 | 12 | (*6) | 17.0 | 17.3 |
| (2) | 215 | TO | 120 | HB | 210 | (*1) | (*1) | (*1) | (*1) | — | — | 17.0 | 17.1 |
| 6 | 215 | — | — | HB | 200 | 2.7 | 2.4 | 2.6 | 2.3 | 12 | B | 17.0 | 17.1 |
|  |  |  |  |  |  | (*2) | (*2) | (*2) | (*2) |  |  |  |  |
| 7 | 215 | HB | 150 | HR | 190 | 2.5 | 2.6 | 2.5 | 2.4 | 4 | A | 17.0 | 17.1 |
| (3) | 215 | HB | 170 | HR | 170 | 5.2 | 4.8 | 5.1 | 4.7 | 6 | (*6) | 17.0 | 17.2 |
| (4) | 215 | HB | 180 | HR | 210 | (*3) | (*3) | (*3) | (*3) | — | — | 17.0 | 17.1 |
| 8 | 215 | HB | 180 | HR | 200 | 2.4 | 2.2 | 2.3 | 2.1 | 9 | A | 17.0 | 17.1 |
| (5) | 215 | HB | 150 | TO | 200 | 4.4 | 3.7 | 4.3 | 2.8 | 42 | D | 17.0 | 17.1 |
| (6) | 215 | HB | 150 | TO | 210 | 3.1 | 2.6 | 3.2 | 1.8 | 56 | D | 17.0 | 17.1 |
| (7) | 215 | HB | 150 | TO | 220 | (*4) | (*4) | (*4) | (*4) | — | — | 17.0 | 17.1 |
| 9 | 247 | TO | 130 | HB | 230 | 2.9 | 3.6 | 3.4 | 3.0 | 13 | B | 17.0 | 17.1 |
| (8) | 247 | TO | 130 | HB | 200 | 5.7 | 6.9 | 6.5 | 5.8 | 11 | (*6) | 17.0 | 17.3 |
| (9) | 247 | TO | 130 | HB | 240 | (*5) | (*5) | (*5) | (*5) | — | — | 17.0 | 17.1 |

Note to Table 1
Parenthesized example Nos. indicate Comparative Examples.
HR: Heat roll, HB: Heat belt, TO: Tenter oven
(*1): Partial blocking to HB.
(*2): Tendency toward blocking to HB.
(*3): Blocking to HR.
(*4): Partial whitening.
(*5): Blocking to HB.
(*6): Great overall shrinkage.

TABLE 2

| Film width Widthwise position | | Roll 1 (860 mm) Left edge | Center | Right edge | Roll 2 (700 mm) Left edge | Center | Right edge |
|---|---|---|---|---|---|---|---|
| Shrinkage | MD | 3.4 | 3.4 | 3.5 | 3.5 | 3.2 | 3.4 |
| Shrinkage | $MD_{45}$ | 2.6 | 2.9 | 3.3 | 3.8 | 3.3 | 3.3 |
| Shrinkage | TD | 2.2 | 2.3 | 2.0 | 2.0 | 2.0 | 1.9 |
| Shrinkage | $MD_{135}$ | 2.8 | 2.4 | 2.0 | 1.6 | 1.9 | 2.1 |
| Anisotropy | H' (%) | −7 | 19 | 49 | 81 | 54 | 44 |

REFERENTIAL EXAMPLE

Two rolls of biaxially oriented polyamide film (860 mm wide and 700 mm wide) obtained from the market were tested for hot-water shrinkage. Specimens were taken from the left edge, the center, and the right edge across the width. Anisotropy (H,) in hot water shrinkage was calculated from the following formula. The results are shown in Table 2.

We claim:
1. A mill roll of biaxially oriented polyamide film which has a shrinkage by hot water at 100° C. smaller than 5.0% after heat setting at all the positions across the widthwise direction of the film in all the directions in the plane and also has a degree of anisotropy H less than 30% in hot water shrinkage which is calculated from the formula below across the entire width of the film:

$$H = \frac{|S_{45} - S_{135}|}{\frac{S_{45} + S_{135}}{2}} \times 100\%$$

where $S_{45}$ and $S_{135}$ respectively denote the shrinkage by hot water at 100° C. in the directions deviated leftward 45° and 135° from the machine direction.

2. Biaxially oriented polyamide film cut to size from a mill roll of biaxially oriented polyamide film which has a shrinkage by hot water at 100° C. smaller than 5.0% after heat setting at all the positions across the widthwise direction of the film in all the directions in the plane and also has a degree of anisotropy H less than 30% in hot water shrinkage which is calculated from the formula below across the entire width of the film:

$$H = \frac{|S_{45} - S_{135}|}{\frac{S_{45} + S_{135}}{2}} \times 100\%$$

where $S_{45}$ and $S_{135}$ respectively denote the shrinkage by hot water at 100° C. in the directions deviated leftward 45° and 135° from the machine direction.

3. A method of heat-setting biaxially oriented polyamide film in flat form, wherein the biaxially oriented polyamide film, with the edges thereof gripped, is heated to an adequate temperature, which is 10°–40° C. lower than the melting point of the film, by bringing it into close contact with the surface of a heating body, and immediately cooling the film, thereafter, such that said film after heat setting has a shrinkage by hot water at 100° C. smaller than 5.0% after heat setting at all the positions across the widthwise direction of the film in all the directions in the plane and also has a degree of anisotropy H less than 30% in hot water shrinkage which is calculated from the formula below across the entire width of the film:

$$H = \frac{|S_{45} - S_{135}|}{\frac{S_{45} + S_{135}}{2}} \times 100\%$$

where $S_{45}$ and $S_{135}$ respectively denote the shrinkage by hot water at 100° C. in the directions deviated leftward 45° and 135° from the machine direction.

4. A method of heat-setting biaxially oriented polyamide film as claimed in claim 3, which comprises one or more stages of preheating to be carried out before the heat setting, said preheating involving the steps of heating the biaxially oriented film at temperatures ranging from the melting point minus 40° C. to the melting point minus 135° C., with the edges of the film gripped, and quenching the film after preheating.

* * * * *